(12) United States Patent
Ben Amor

(10) Patent No.: US 9,289,830 B2
(45) Date of Patent: Mar. 22, 2016

(54) CUTTING TOOL AND CUTTING INSERT

(75) Inventor: Raouf Ben Amor, Lorch (DE)

(73) Assignee: CeramTec GmbH, Plochingen (DE)

( * ) Notice: Subject to any disclaimer, the term of this patent is extended or adjusted under 35 U.S.C. 154(b) by 331 days.

(21) Appl. No.: 13/813,201

(22) PCT Filed: Aug. 4, 2011

(86) PCT No.: PCT/EP2011/063438
§ 371 (c)(1),
(2), (4) Date: Jan. 30, 2013

(87) PCT Pub. No.: WO2012/017031
PCT Pub. Date: Feb. 9, 2012

(65) Prior Publication Data
US 2013/0129438 A1 May 23, 2013

(30) Foreign Application Priority Data

Aug. 4, 2010 (DE) .......................... 10 2010 038 877

(51) Int. Cl.
*B23B 27/16* (2006.01)
*B23B 27/14* (2006.01)

(52) U.S. Cl.
CPC ........... *B23B 27/1666* (2013.01); *B23B 27/145* (2013.01); *B23B 27/1651* (2013.01); *B23B 2200/088* (2013.01); *B23B 2265/32* (2013.01); *Y10T 407/229* (2015.01); *Y10T 407/2286* (2015.01); *Y10T 407/23* (2015.01)

(58) Field of Classification Search
CPC  B23B 27/16; B23B 27/1603; B23B 27/1614; B23B 27/1625; B23B 27/1644; B23B 27/1659; B23B 27/1662; B23B 27/1666; B23B 27/1667; Y10T 407/23; Y10T 407/2282; Y10T 407/2286; Y10T 407/229; Y10T 407/2292
USPC .......................... 407/113, 107, 109, 111, 112
See application file for complete search history.

(56) References Cited

U.S. PATENT DOCUMENTS

| 5,076,738 A | 12/1991 | Pano et al. |
| 5,100,268 A | 3/1992 | Nakayama et al. |
| 5,820,311 A | 10/1998 | Gruen et al. |

(Continued)

FOREIGN PATENT DOCUMENTS

| DE | 19854873 A1 * | 5/2000 |
| EP | 0 402 934 A2 | 12/1990 |

(Continued)

*Primary Examiner* — Daniel Howell
*Assistant Examiner* — Nicole N Ramos
(74) *Attorney, Agent, or Firm* — Norton Rose Fulbright US LLP

(57) ABSTRACT

A cutting tool has a recess for receiving a cutting insert having a clamping depression on the rake face. The cutting insert is held in the carrier tool by a clamping finger having a lug. The clamping finger being secured on the carrier tool via a clamping bolt so that when tightening the clamping bolt, the clamping finger pulls the cutting insert into the recess. A sickle-shaped engagement element engages into the clamping depression of the cutting insert being arranged on the lug. The clamping bolt has a clamping head overhanging its shank. The clamping head is seated on an angled locating surface of the clamping finger with respect to the axis of the clamping bolt, wherein said surface is arranged so compression force of the clamping finger on the cutting insert is enhanced. The lug has a clamping surface for bearing on the rake face of the cutting insert.

13 Claims, 3 Drawing Sheets

(56) References Cited

U.S. PATENT DOCUMENTS

| | | | |
|---|---|---|---|
| 6,394,709 B1 * | 5/2002 | Sjoo et al. | 407/2 |
| 7,073,986 B2 | 7/2006 | Andras | |
| 7,195,427 B2 | 3/2007 | Sjoo et al. | |
| 7,320,563 B2 | 1/2008 | Mueller et al. | |
| 7,547,163 B2 | 6/2009 | Morrison et al. | |
| 7,758,286 B2 * | 7/2010 | Nagaya et al. | 407/101 |
| 8,388,273 B2 * | 3/2013 | Eder et al. | 407/107 |
| 2003/0086766 A1 * | 5/2003 | Andras | 407/102 |
| 2010/0183385 A1 * | 7/2010 | Conway et al. | 407/107 |

FOREIGN PATENT DOCUMENTS

| | | |
|---|---|---|
| EP | 0 753 366 A1 | 1/1997 |
| EP | 1 693 133 A1 | 8/2006 |
| NL | 8902275 A | 4/1991 |
| WO | 2004/024379 A1 | 3/2004 |
| WO | 2004/058437 A1 | 7/2004 |
| WO | 2009/011986 A1 | 1/2009 |

* cited by examiner

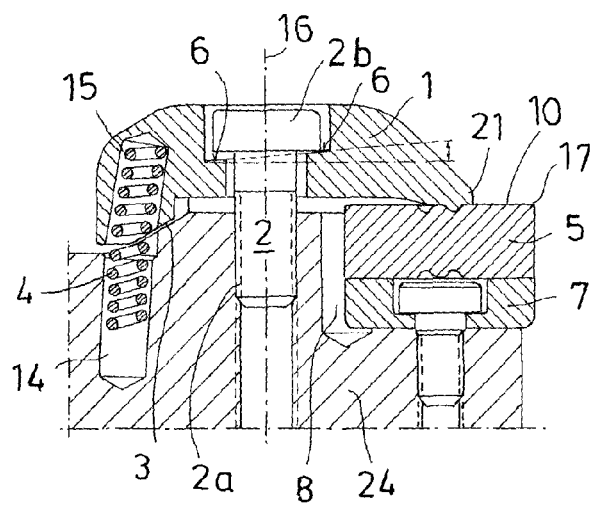
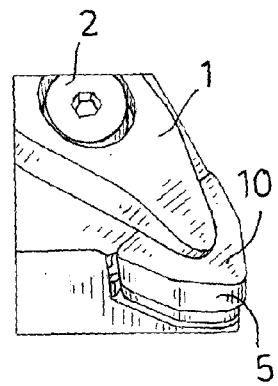
Fig.1
Fig.2
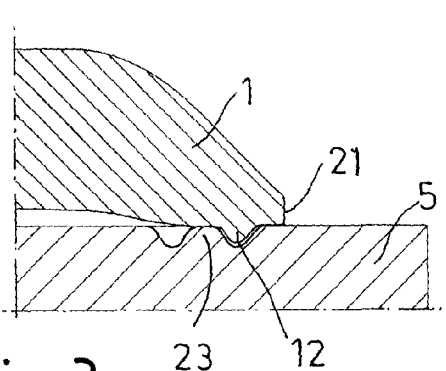
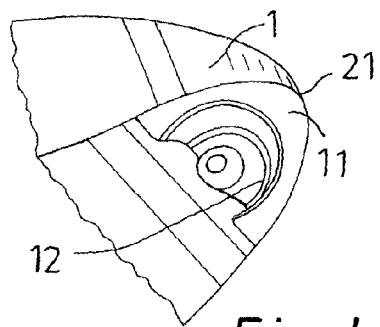
Fig.3
Fig.4
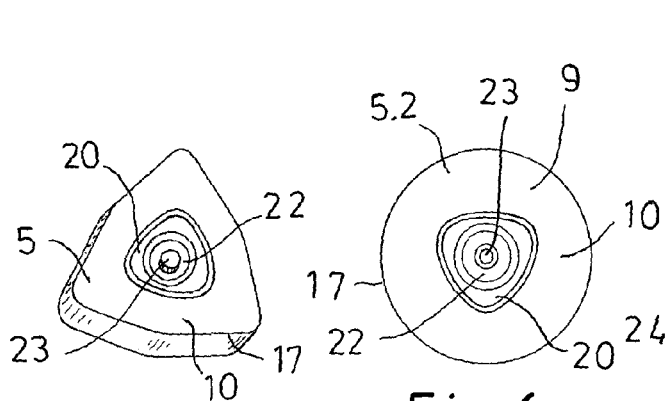
Fig.5
Fig.6
Fig.7

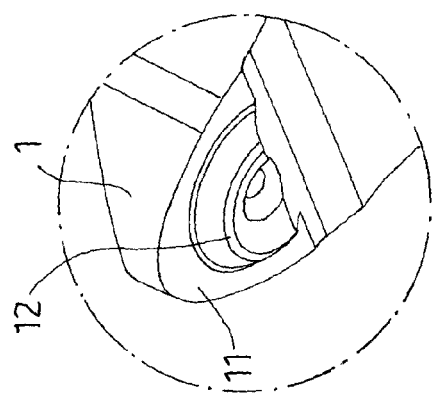
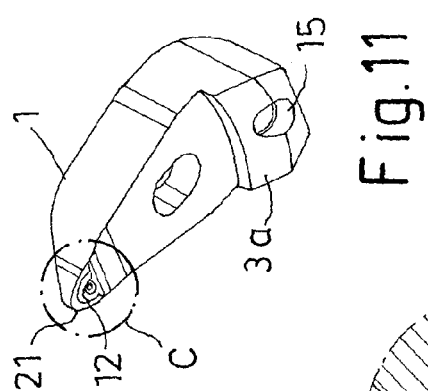
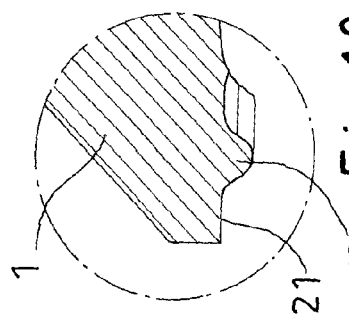
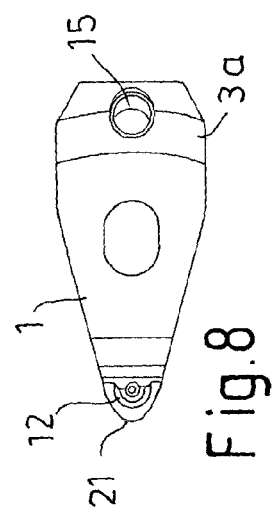
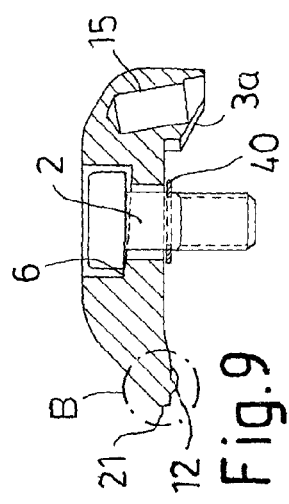
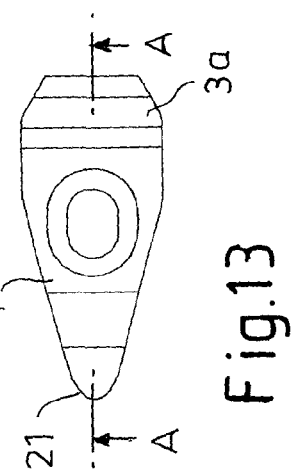

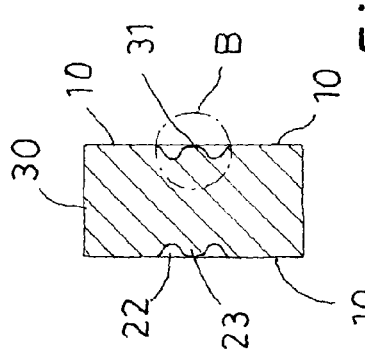
Fig.15 SECTION A-A
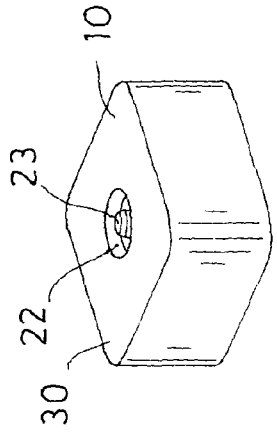
Fig.17
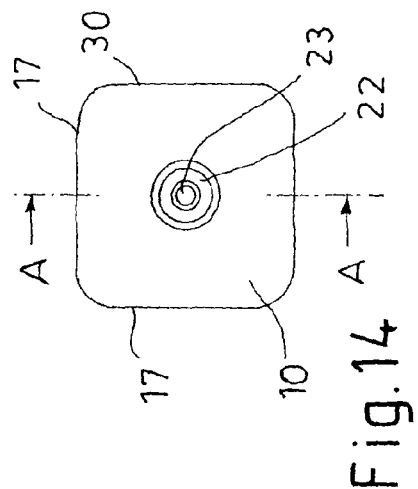
Fig.14
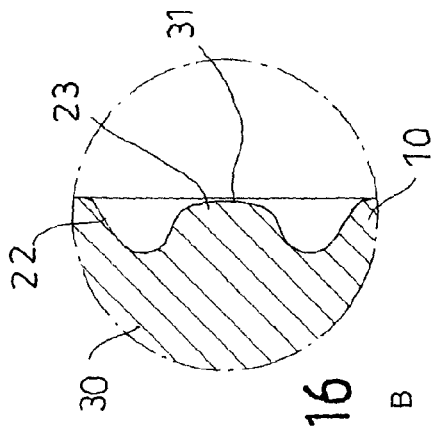
Fig.16 DETAIL B

CUTTING TOOL AND CUTTING INSERT

This application is a §371 of International Application No. PCT/EP2011/063438 filed Aug. 4, 2011, and claims priority from German Patent Application No. 10 2010 038 877.7 filed Aug. 4, 2010, hereby incorporated by reference in its entirety.

The invention relates to a cutting tool substantially consisting of a carrier tool which has a recess for receiving a cutting insert with a clamping depression on the rake face, the cutting insert being held in the carrier tool by a clamping finger having a lug, the clamping finger being secured on the carrier tool via a clamping bolt in such a manner that when tightening the clamping bolt, the clamping finger pulls the cutting insert into the recess, and a sickle-shaped engagement element for engaging in the clamping depression of the cutting insert being arranged on the lug.

BACKGROUND OF THE INVENTION

Such a cutting tool is shown in U.S. Pat. No. 7,073,986. Since the clamping finger is positively guided via a pin in an oblong hole, the clamping finger pulls the cutting insert into the recess on the carrier body; however, substantially no radial compression force of the clamping finger is applied to the cutting insert. Furthermore, due to the double guidance of the clamping finger, secure clamping of the cutting insert is often not possible. When in use, this can result in disengagement of the cutting insert from the cutting tool.

OBJECTS OF THE INVENTION

It is an object of the invention to configure a cutting tool according to the present invention in such a manner that the clamping force acting on the cutting insert is improved. Also, the ratio of compression force toward the insert seat locating face and tensile force against the insert seat back face shall be improved.

SUMMARY OF THE INVENTION

According to the invention, this object is achieved by the features of the present invention.

BRIEF DESCRIPTION OF THE FIGURES

FIG. 1 shows, inter alia, a cutting tool in accordance with the invention.

FIG. 2 shows, inter alia, a clamping finger according to the invention.

FIG. 3 shows, inter alia, a clamping finger according to the invention on a cutting insert.

FIG. 4 show, inter alia, s the lower side of a clamping finger according to an embodiment of the invention.

FIG. 5 shows, inter alia, an embodiment according to the invention wherein the cutting insert is substantially triangular.

FIG. 6 shows, inter alia, an embodiment according to the invention wherein the cutting insert is round.

FIG. 7 discloses, inter alia, a clamping finger according to the present invention with a cutting insert as shown in FIG. 5.

FIG. 8 shows, inter alia, the lower side of a clamping finger according to an embodiment of the invention.

FIG. 9 shows, inter alia, a clamping finger according to an embodiment of the invention.

FIG. 10 shows, inter alia, detail of a clamping finger according to an embodiment of the invention.

FIG. 11 shows, inter alia, a clamping finger according to an embodiment of the invention.

FIG. 12 shows, inter alia, detail of clamping finger according to an embodiment of the invention.

FIG. 13 shows, inter alia, a clamping finger according to an embodiment of the invention along axis A-A.

FIG. 14 shows a square cutting insert with a clamping depression in which an elevation is arranged.

FIG. 15 shows a square cutting insert with a clamping depression in which an elevation is arranged through section A-A.

FIG. 16 shows detail of a square cutting insert with an elevation and a clamping depression.

FIG. 17 shows a cutting insert.

DETAILED DESCRIPTION

Due to the fact that the clamping bolt has a clamping head which overhangs with respect to its shaft, the clamping head being seated on a locating surface of the clamping finger which locating surface is angled with respect to the axis of the clamping bolt, and the angled locating surface being arranged in such a manner that the compression force of the clamping finger on the cutting insert is enhanced, the clamping head does not press with its entire area on the locating surface of the clamping finger, but presses in such a manner that the compression force of the clamping finger is enhanced. As a result, the compression force on the cutting insert is improved. The angled locating surface moves the pressure point forward as far as possible toward the lug so that an optimal ratio of compression force and tensile force can be set. Hereby, the compression force is shifted toward the cutting insert.

In addition, the clamping conditions are also improved in that the lug of the clamping finger has a clamping surface for bearing against the rake face of the cutting insert. Hereby, not only the engagement element exerts force onto the cutting insert, but the clamping surface presses also on the cutting insert so that in this regard too, the clamping force acting on the cutting insert is improved.

Preferably, that region of the angled locating surface that is the highest with regard to the axis of the clamping bolt is the one that, with respect to the other regions of the locating surface, is located closest to the lug of the clamping finger. The clamping head presses onto this highest region. In this manner, the clamping force is applied to the clamping finger as far as possible toward the lug. Hereby, the clamping force acting on the cutting insert is improved.

Preferably, the shank of the clamping bolt and the clamping head are guided in an oblong hole in the clamping finger. Through this, the clamping bolt is guided with play in the clamping finger when being tightened.

A preferred embodiment is characterized in that the clamping finger, at its end facing away from the lug, has a concave or convex chamfer which bears on another chamfer on the carrier tool and which, when screwing in the clamping bolt, effects a movement in the opposite direction to the cutting insert. Through this, the cutting insert is pulled via the engagement element into the recess on the carrier tool, i.e., into the cutting insert seat. For example, by means of a hollow shape of the uneven chamfer it is ensured that the clamping finger has three contact points and therefore lies securely on the cutting insert and the carrier tool. In this case, the clamping finger has two contact points on its end facing away from the lug and one contact point on the cutting insert.

In order to be able to remove the cutting insert in a simple manner from the carrier tool, preferably, a compression spring is arranged between the clamping finger and the carrier tool. Aligning the clamping bolt in the clamping finger is also conceivable. In any case, it has to be ensured that when untightening the clamping bolt, the clamping finger moves upward and thus releases the cutting insert.

For this, in one embodiment, a first bore is arranged in the carrier tool in the region of the chamfer and a second bore is arranged in the clamping finger at an angle between 0° and 90° to the first bore, and the compression spring is arranged with one end in the first bore and with the other end in the second bore. When untightening the clamping bolt, the clamping finger is lifted by the spring. In one embodiment, the first bore can be arranged in alignment with the second bore, i.e., at an angle of 0°.

For securing the orientation of the cutting insert, the clamping surface on the lug of the clamping finger is formed in a geometry that differs from a circle and engages in an indentation on the rake face of the cutting insert, which indentation corresponds to the negative form of the clamping surface. Through this, for example in the case of a cylindrical cutting insert, the orientations can be predefined. This enables a defined rotational indexing of the cutting insert and therefore an optimal utilization of said insert.

Preferably, the engagement element is arranged on the clamping surface and the clamping depression is arranged within the indentation. Through this, the clamping surface is seated on the indentation in the cutting insert and, at the same time, the engagement element engages in the clamping depression so that at the same time, the cutting insert is pulled and is pressed from above into its seat. Of course, the engagement element can only be so large or long that the clamping surface always rests planarly on the rake face or the indentation. If the engagement element would be larger, the clamping surface would not rest flatly on the rake surface or indentation and no pressure would be applied from above onto the cutting insert by the clamping surface.

In one embodiment, the clamping surface is formed to be eccentric to the center of the sickle-shaped engagement element. The clamping surface, for example, is formed elliptically. The clamping depression in the cutting insert is adapted to the clamping surface of the lug. Implementing the clamping depression in the cutting insert can be carried out by sintering or material removing methods.

In a special embodiment, the clamping surface is formed triangular with rounded sides. Other indentations positioned eccentrically toward the center of the cutting insert are also conceivable for this purpose.

A cutting insert according to the invention having a rake face and a clamping depression on the rake face is characterized in that an indentation is arranged on the rake face and the clamping depression is arranged within the indentation, and in the clamping depression, there is a circular elevation the height of which lies below the rake face, and the indentation is formed in a geometry that differs from a circle. This embodiment is in particular suitable for sickle-shaped engagement elements which embrace the circular elevation from the front, i.e., in the direction toward the cutting edge, and anchor it in the insert seat by pulling.

Preferably, the indentation is formed to be elliptical or triangular with rounded sides.

Preferably, this cutting insert is used in the cutting tool according to the invention.

The invention is further explained hereinafter by means of different figures.

It is apparent from the figures that the clamping finger 1 is oriented through the clamping bolt 2, the uneven chamfer 3a (see FIGS. 8, 9, 11, 13) and the clamping depression. This means that the clamping finger 1 is fastened on the carrier tool 24 in a rotatably locked manner. A spring 4 (see FIG. 1) secures the upward movement of the clamping finger 1 when untightening the clamping bolt 2 so that already after one turn, the cutting insert 5, 9, 30 can be removed. In all given embodiments, the cutting insert 5, 9, 30 can be an indexable insert.

Via the chamfers 3 or 3a and 3b (see FIGS. 1, 8, 9, 11, 13), the clamping finger 1 is pulled backward during clamping. The angled locating surface 6 (see FIG. 1) on the clamping finger 1 shifts the pressure point forward as far as possible so that an optimal ratio of compression force and tensile force can be set. The clamping bolt 2 is preferably secured on the clamping finger 1 by means of a retaining ring 40. See FIG. 9.

The clamping finger 1 has on its lug 21 a locating surface or clamping surface 11 (FIG. 4) which transmits the compression force onto the cutting insert 5, 9, 30. An elevation 23 in the clamping depression 22 of the cutting insert 5, 9, 30 is surrounded by a ring section or a sickle-shaped engagement element 12 on the clamping surface 11 of the clamping finger 1 (see FIGS. 1, 3, 4, 10, 12). During clamping, the clamping finger 1 performs a downward and a backward movement. The clamping surface 11 secures the contact of the cutting insert 5, 9, 30 with the support plate 7 (FIG. 1). The ring section or, respectively, the sickle-shaped engagement element 12 secures the retraction movement of the cutting insert 5, 9, 30 against the insert seat or, respectively, into the recess 8 in the carrier tool 24 and holds the cutting insert in position in a positive-locking manner.

For cutting insert geometries in the case of which angular orientation is not or not sufficiently provided by the geometry of the cutting insert 5, 9, the shape of the lug 21 of the clamping finger 1 is used. An indentation 20 on the rake face 10 of the cutting insert 5, 9, which indentation has the negative form of the lug 21, is oriented according to the alignment of the clamping finger 1. This secures the orientation of the cutting insert 5, 9. The FIGS. 14, 15 show a square cutting insert 30 which has no indentation 20. With regard to the clamping depression 22, this cutting insert 30 is identical to the other cutting inserts 5, 9.

In the case of round cutting inserts 9, rotatably indexing becomes uniform due to the indentation 20 and the shape of the lug 21 or the clamping surface 11. It is ensured that neither cutting edges 17 are wasted nor already used ones are used again. Depending on the application, the indexing angle can be varied. In the case of indexable cutting inserts, the angular orientation for a constant L- and M-dimension is ensured through positive locking in the lug region.

FIGS. 5 and 7 show a substantially triangular cutting insert 5, and FIG. 6 shows a round cutting insert 9, and FIGS. 14 and 15 show a square cutting insert 30 or, respectively, cutting tip as an indexable cutting insert for machining metallic workpieces. On the rake face 10, the cutting inserts 5, 9 have an indentation 20, the negative form of which corresponds to the lower side or clamping surface 11 of the lug 21 of the clamping finger 1. Within the indentation 20, there is a circular clamping depression 22 in the center of which, in turn, a spherical or circular elevation 23 is placed. This clamping depression 22 and the elevation 23 shall serve for fixing the cutting inserts 5, 9, 30 in a suitable receptacle, here referred to as insert seat 8, on a suitable carrier tool 24.

FIG. 1 shows such a carrier tool 24 with a clamping finger 1 secured by a clamping bolt 2. The clamping finger 1 is illustrated in the FIGS. 1, 2, 3, 4 and 7 and 8 to 13. The clamping force generated by tightening the clamping bolt 2 is transmitted via the clamping finger 1 onto the cutting insert 5, 9, 30. As a particular feature, the clamping claw or the clamping finger 1 has a sickle-shaped engagement element 12 on its lower side located above the cutting insert 5, 9, 30. In the assembled state, the lower side or clamping surface 11 of the lug 21 is seated on the indentation 20 or on the rake face of the cutting insert 5, 9, 30, wherein at the same time, the sickle-shaped engagement element 12 engages in the clamping depression 22 and surrounds the elevation 23 in a semicircular manner. This sickle-shaped engagement element 12 has to embrace the elevation 23 from the front. Front designates the lug 21 (e.g. FIG. 1) and back designates the chamfer 3a, 3b.

When tightening the clamping bolt 2, the clamping finger 1 moves downward and, at the same time, slides with the chamfer 3a backward on a similar chamfer 3b in the carrier tool 24. Since the clamping finger 1, due to the resulting clamping force, engages via the sickle-shaped engagement element 12 in a positive locking manner on the side opposite the chamfer 3 with the clamping depression 22 and the elevation 23 by embracing them from the front, the movement directed sideward into the corner of the insert seat is transmitted onto the cutting insert 5, 9, 30. Upon reaching a certain clamping force, the lever movement of the clamping finger 1 on the cutting insert 5, 9, 30 increases and in addition now also presses with the lower side, i.e., the clamping surface 11 of the lug 21, onto the indentation 20 or onto the rake face 10 (FIGS. 14, 15). The outstanding feature of this interaction is that in combination of all elements, a slipping of the cutting insert 5, 9, 30 out of its insert seat is no longer possible due to the implemented shapes and chamfers.

FIGS. 4, 8 11 and 12 show the lower side of the clamping finger 1 with the sickle-shaped engagement element 12 which engages with the clamping depression 22 and the elevation 23 by semicircularly embracing them. Also, the lug 21 which bears on the indentation 20 is clearly shown. The lug 21 and the associated indentation 20 are formed ovally, as shown in the FIGS. 5 and 6. This embodiment is advantageous because it is well suited for transmitting forces, and the lug 21 is not too slim so that it cannot break. Through the configuration of the lug 21 and the associated shape of the indentation 20 it is determined how often the cutting insert 5, 9 has to be turned in the carrier tool 24. This is in particular advantageous in the case of round cutting inserts according to FIG. 6. Up to now, round cutting inserts 9 are sometimes not turned far enough so that completely unused cutting edges are not made available again for machining. Due to the indentation 20 and the associated clamping surface 11 of the lug 21, this is no longer possible. Correct clamping is possible only in the predefined directions.

In addition, the FIGS. 14 to 16 show a square cutting insert 30 with a clamping depression 22 in which an elevation 23 is arranged. The tip 31 of the elevation 23 lies slightly below the rake face 10. Preferably, said tip lies one millimeter below the rake face 10. Rotation prevention is not necessary here.

It is claimed:

1. A cutting tool comprising:
   a carrier tool which has a recess for receiving a cutting insert having a clamping depression on a rake face thereof,
   a clamping finger for holding the cutting insert in the tool, the clamping finger having a lug,
   a clamping bolt for securing the clamping finger on the carrier tool in such a manner that when the clamping bolt is tightened the clamping finger pulls the cutting insert into the recess; and
   a sickle-shaped engagement element for engaging into the clamping depression of the cutting insert being arranged on the lug;
   wherein the clamping bolt has clamping head which overhangs with respect to its shank, the clamping head is seated on a locating surface of the clamping finger, which locating surface is angled with respect to the axis of the clamping bolt,
   wherein the lug of the clamping finger has a clamping surface for bearing on the rake face of the cutting insert;
   wherein a first bore is arranged in a region of a chamfer;
   wherein in the clamping finger a second bore is arranged at an angle between 0° and 90° to the first bore; and
   wherein a compression spring is arranged with one end in the first bore and with the other end in the second bore.

2. A cutting tool comprising:
   a carrier tool which has a recess for receiving a cutting insert having a clamping depression on a rake face thereof,
   a clamping finger for holding the cutting insert in the tool, the clamping finger having a lug,
   a clamping bolt for securing the clamping finger on the carrier tool in such a manner that when the clamping bolt is tightened the clamping finger pulls the cutting insert into the recess; and
   a sickle-shaped engagement element for engaging into the clamping depression of the cutting insert being arranged on the lug;
   wherein the clamping bolt has clamping head which overhangs with respect to its shank, the clamping head is seated on a locating surface of the clamping finger, which locating surface is angled with respect to the axis of the clamping bolt,
   wherein the lug of the clamping finger has a clamping surface for bearing on the rake face of the cutting insert;
   wherein a first bore is arranged in a region of a chamfer;
   wherein in the clamping finger a second bore is arranged at an angle between 0° and 90° to the first bore; and
   wherein a compression spring is arranged with one end in the first bore and with the other end in the second bore, and
   wherein the region of the angled locating surface which is a highest region with regard to the axis of the clamping bolt is the one which, with respect to other regions of the locating surface (6), is located closest to the lug of the clamping finger.

3. The cutting tool according to claim 1, wherein the shank of the clamping bolt and the clamping head are guided in an oblong hole of the clamping finger.

4. The cutting tool according to claim 1, wherein the clamping finger, at its end facing away from the lug, has an uneven, concave or convex chamfer which bears on a chamfer on the carrier tool and which, when screwing in the clamping bolt, effects a movement of the clamping finger in the opposite direction to the cutting insert.

5. The cutting tool according to claim 1, wherein the clamping surface on the lug of the clamping finger is formed in a geometry that differs from a circle.

6. The cutting tool according to claim 5, wherein the engagement element is arranged on the clamping surface.

7. The cutting tool according to claim 5, wherein the clamping surface is formed to be eccentric to the center of the sickle-shaped engagement element.

8. A cutting tool comprising:
   a carrier tool which has a recess for receiving a cutting insert having a clamping depression on a rake face thereof,
   a clamping finger for holding the cutting insert in the tool, the clamping finger having a lug, a clamping bolt for securing the clamping finger on the carrier tool in such a manner that when the clamping bolt is tightened the clamping finger pulls the cutting insert into the recess; and a sickle-shaped engagement element for engaging into the clamping depression of the cutting insert being arranged on the lug;

wherein the clamping bolt has clamping head which overhangs with respect to its shank, wherein the shank and the clamping head are guided in an oblong hole of the clamping finger and wherein the clamping head is seated on a locating surface of the clamping finger, which locating surface is angled with respect to the axis of the clamping bolt; wherein the region of the angled locating surface which is a highest region with regard to the axis of the clamping bolt is the one which, with respect to other regions of the locating surface, is located closest to the lug of the clamping finger, wherein the lug of the clamping finger has a clamping surface for bearing on the rake face of the cutting insert.

9. A cutting tool comprising:

a carrier tool which has a recess for receiving a cutting insert having a clamping depression on a rake face thereof, a clamping finger for holding the cutting insert in the tool, the clamping finger having a lug, a clamping bolt for securing the clamping finger on the carrier tool in such a manner that when the clamping bolt is tightened the clamping finger pulls the cutting insert into the recess; and a sickle-shaped engagement element for engaging into the clamping depression of the cutting insert being arranged on the lug;

wherein the clamping bolt has clamping head which overhangs with respect to its shank, the clamping head is seated on a locating surface of the clamping finger, which locating surface is angled with respect to the axis of the clamping bolt, and wherein the lug of the clamping finger has a clamping surface for bearing on the rake face of the cutting insert, and wherein the region of the angled locating surface which is a highest region with regard to the axis of the clamping bolt is the one which, with respect to other regions of the locating surface (6), is located closest to the lug of the clamping finger.

10. The cutting tool according to claim 8, wherein the clamping finger, at its end facing away from the lug, has an uneven, concave or convex chamfer which bears on a chamfer on the carrier tool and which, when screwing in the clamping bolt, effects a movement of the clamping finger in the opposite direction to the cutting insert.

11. The cutting tool according to claim 8, wherein the clamping surface on the lug of the clamping finger is formed in a geometry that differs from a circle.

12. The cutting tool according to claim 8, wherein the engagement element is arranged on the clamping surface.

13. The cutting tool according to claim 8, wherein the clamping surface is formed to be eccentric to the center of the sickle-shaped engagement element.

\* \* \* \* \*